2,946,402
PROCESS FOR RECOVERING HYDROCYANIC ACID FROM GAS MIXTURES CONTAINING THE SAME

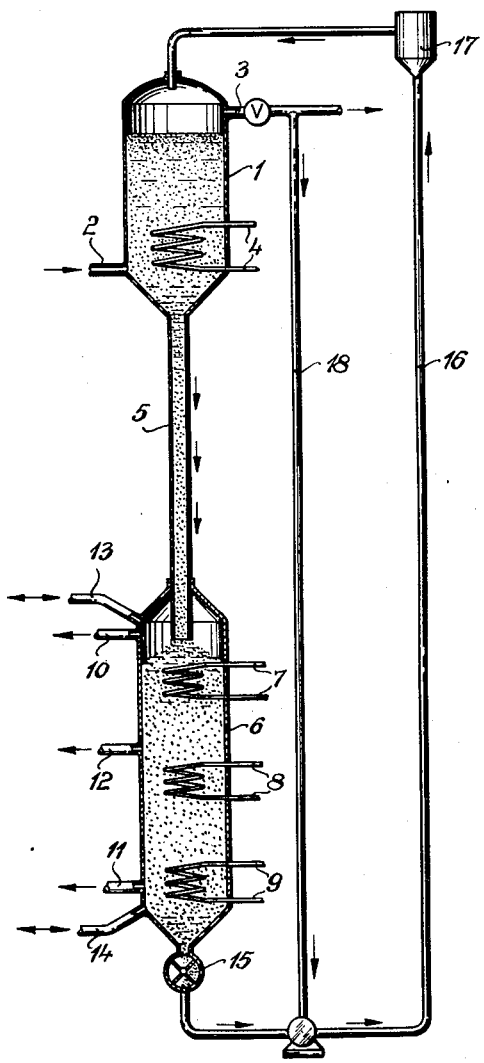

Erich H. Becker-Boost, Bochum, and Hermann Kronacher, Trostberg, Germany, assignors to Dr. C. Otto & Comp. G.m.b.H., Bochum, Germany Filed May 28, 1957, Ser. No. 662,241

1 Claim. (Cl. 183—114.2)

The present invention relates to a process for recovering hydrocyanic acid from gas mixtures containing the same, e.g. coal distillation gases.

Methods hitherto known, either use a rinsing of the gas mixture with suitable liquids for obtaining the said acid, or they employ containers arranged ahead of, or behind, the incoming gases, said containers being filled with mass for adsorbing the hydrocyanic acid. These methods are expensive and do not lead to a quantitative recovery of the acid. Such a recovery is however necessary in many cases when the gases containing the acid are to be further processed.

It has already been suggested to use the high adsorptive capacity of active carbon for adsorption of liquid hydrocyanic acid as a simple means of transportation of said acid. Experience has shown, however, that hydrocyanic acid undergoes far-reaching polymerization or decomposition during the adsorption and regeneration of the active carbon and the acid can no longer be recovered in pure form. Likewise, the active carbon is not satisfactory for repeated use, since the polymerized hydrocyanic acid is deposited on the adsorption medium as a sticky mass.

It has further been proposed to treat carbonaceous substances with acids, among others with phosphoric acid, for the purpose of producing highly active carbon, the acids being subsequently driven off. In this method phosphoric acid has the role of a substance which splits off water, or acts as an activating agent.

It is an object of the present invention to avoid the disadvantages hitherto encountered in the adsorption of hydrocyanic acid by active carbon.

It has been discovered that by impregnating active carbon, pretreated with acid and thus activated, with a substance preventing polymerization or decomposition of hydrocyanic acid in its adsorption by active carbon, or its desorption, respectively, the desorbed acid will be obtained in pure state.

For the impregnation of carbon, phosphoric acid or compounds containing the same, are primarily useful. It is an unexpected fact that the adsorptive capacity of active carbon is favorably influenced by the impregnation of such substances so that the quantitative separation of hydrocyanic acid from gas mixtures can be carried out at ordinary pressure. After the impregnated active carbon has adsorbed a sufficient amount of hydrocyanic acid, the latter is desorbed by direct or indirect heating of the active carbon, with or without application of a carrier gas current.

According to a further embodiment of the present invention, nitrogen or air may be used as carrier gas, the separation of the hydrocyanic acid from the carrier gas being accomplished by low cooling or washing. When the active carbon is directly heated, the heating gas simultaneously acts as a carrier gas. Likewise, where indirect heating of the active carbon is used, for instance by means of heating coils or the like arranged in the adsorption vessel, the simultaneous application of a rinsing gas, preferably nitrogen or air, may be advisable.

The adsorption of hydrocyanic acid by active carbon occurs quantitatively within a very short time at ordinary pressure, even when the carbon is charged with a small amount of the acid from a previous desorption; the adsorption occurs preferably at low temperature, e.g. below 10° C. Assuming that the carrier gas is circulated, the separation of hydrocyanic acid from the same does not have to be quantitative. It is therefore possible to carry out all the operations in a short time and in comparatively small apparatus.

Preferably, the desorption of the hydrocyanic acid from active carbon is effected at reduced pressure, more particularly at 10–100 mm. mercury column. When indirect heating of the active carbon is applied and no carrier gas current is used, undiluted hydrocyanic acid can be obtained in gas form. In most cases it is, however, advantageous to make use of the rinsing action of a carrier gas and to separate the hydrocyanic acid therefrom by low cooling or by washing in liquid state. As rinsing liquid we use preferably water from which the hydrocyanic acid can be recovered by pressure distillation. Instead of water, some appropriate ester may serve as rinsing liquid.

The adsorption of hydrocyanic acid from the gaseous mixture by means of impregnated active carbon and the desorption of the enriched active carbon may be carried out in any suitable vessel containing a stationary layer or a movable or eddy layer of the carbon. In the latter case it is advisable to maintain the hydrocyanic acid in a current or in turbulence by means of the main gas current during the adsorption period, and by means of the carrier gas current in the desorption period. Since the reaction between the hydrocyanic acid and active carbon is an exothermic reaction, it is necessary to provide for the dissipation of the reaction heat, for instance by arrangement of cooling coils in the reaction vessel. These may then be used as heating coils for the subsequent desorption of the hydrocyanic acid from the enriched active carbon.

A particularly rapid adsorption of hydrocyanic acid with even charging of all particles of the active carbon will be brought about when, according to a further embodiment of the invention, the latter is admixed in a finely distributed state to the current of the HCN-containing gases and after quantitative separation of the acid the same is removed in a suitable device, for instance a separator with eddy formation. The reaction heat evolved during HCN adsorption is dissipated in this way over the large amount of the main gas current so that no particular cooling means are required. The desorption of the hydrocyanic acid from the enriched active carbon is preferably effected by means of a pre-heated carrier gas, preferably nitrogen or air.

It has been found that in the adsorption of hydrocyanic acid from gases which contain apart from hydrocyanic acid, steam and carbon dioxide, the active carbon will partly adsorb these components, too. The capacity of the carbon is increased as far as HCN goes by the impregnation with phosphoric acid, while it is decreased for carbon dioxide; however, in the following desorption, a mixture of hydrocyanic acid, steam and carbon dioxide is always obtained. In the further processing for obtaining the salts of hydrocyanic acid, e.g. sodium cyanide, a sodium carbonate-containing product of low commercial value, is obtained. The steam content is unfavorable in the condensation in as much as not pure, but aqueous hydrocyanic acid is obtained.

In order to obtain final products of a special purity, according to a further embodiment of the invention, a cold desorption with nitrogen or air is carried out before driving off the hydrocyanic acid. In this manner it is accomplished that gases superficially bound to active carbon, particularly carbon dioxide, are first separated from the carbon. Preferably the desorption is carried out in two or more stages. In the first stage the bulk of carbon dioxide is removed by means of cold carrier gas. Following the cold desorption, the filter is heated and the hydrocyanic acid is driven off practically free of carbon dioxide.

Waste gases of the first stage, which contain small amounts of hydrocyanic acid and returned to the circulating gas so that no hydrocyanic acid is lost in the process; the waste gas of the second stage, that is, the heat desorption, may be used directly for the preparation of very pure cyanides or for obtaining liquid hydrocyanic acid.

In the following, the invention will be more fully described in an example, but it should be understood that this is given by way of illustration and not of limitation and that many changes in the details can be made without departing from the spirit of the invention.

*Example*

(a) A charged filter of active carbon is rinsed at a temperature of 10.1 to 11.7° C. with nitrogen in an amount of 97.5 normal cu. meters. The rinsing is maintained for 1.4 hours, during which time 1.9 kgs. of hydrocyanic acid and 2.7 $CO_2$ are desorbed. The HCN contents in the rinsing gas was 1.7% per volume. Subsequently, the removal of hydrocyanic acid was carried out in a second desorption stage at a gas temperature of 33 to 44.5° C. The active carbon had a temperature of about 68° C., the rinsing gas amounted to 33.5 cu. meters (nitrogen plus HCN) and in a desorption period of 2.6 hours, 14.0 kgs. HCN and 0.2 kg. $CO_2$ were desorbed.

The ratio HCN:$CO_2$ is shifted from 1.9:2.7=1:1.42 in the cold desorption, to 14.0:0.2=1:0.014 in the hot desorption. Since the filters in operation contained about 350 kgs. of active carbon, the capacity of carbon for carbon dioxide was 0.75 gr. $CO_2$ per 100 grs. carbon, whereas the capacity for hydrocyanic acid was 4.5 grs. HCN per 100 grs. carbon.

The hot desorption, i.e. the second stage, takes about 2 hours when hot water is used, about ¾ of an hour when steam is used as indirect heating means. For the cold desorption we need about 1½ hours. The total time required is 3½ or 2¾ hours, respectively.

In order to avoid unnecessary delays by these comparatively lengthy desorption periods, the separation of $CO_2$ and HCN can be carried out continuously. Such a method of operation has the advantage of requiring lower quantities of adsorption agents and a lower consumption of heating and cooling agents.

The following heat balance will show this. For the non-continuous desorption the following amounts of heat were consumed:

| | Kcal. |
|---|---|
| Desorption heat for HCN | 4520 |
| Heating of active carbon | 4380 |
| Heating of adsorptive agent | 10500 |
| Total | 19400 |

Since for heating the metallic material almost half of the total input is consumed, which has to be carried off by means of a coolant in the subsequent adsorption operation, it is much more advantageous to effect desorption continuously.

(b) Through a reaction vessel, which contains active carbon in stationary or turbulent form, gas is passed. At the inlet of the gas mixture, active carbon is withdrawn and is conveyed into a desorption vessel by way of a sluice-like device or a long thin tube. The nitrogen used for desorption is either passed into the desorber in the same direction with the active carbon, from the top, or, if desired, in countercurrent from below. In the desorption vessel a temperature gradient is preferably maintained from top to bottom, the uppermost part of the vessel, where carbon dioxide is desorbed, being maintained at 10 to 15° C., the center where HCN is desorbed at 60–80° C. At the bottom steam may be driven off at a temperature of 130° C. The active carbon withdrawn from the desorption apparatus and freed from HCN and $CO_2$ is reintroduced into the adsorber. It is advantageous to transport the active carbon, which is discharged from the desorber in hot state, pneumatically, for instance by means for a partial stream of purified gas, the carbon being simultaneously cooled in this manner.

(c) In a modified embodiment the adsorption is carried out in a column of active carbon, the bottom portion of which, where a mixture of HCN, $H_2O$, and $CO_2$ enters, being maintained at a slightly higher temperature than before, for instance 20–30° C. so that the active carbon withdrawn from the apparatus is practically free of carbon dioxide.

In the following, the continuous operation of the method according to the invention will be described with reference to a diagrammatic drawing. In this drawing, a container charge with an adsorption agent is designated by 1. A tube 2 is provided for the admission of a gas from which hydrocyanic acid is to be recovered. The gas escapes through tube 3. For maintaining the necessary temperature, a heating coil 4 is provided in the container 1.

At the bottom of the container, a pipe 5 is arranged through which the enriched adsorption agent is withdrawn and conveyed to a desorption vessel 6. Three coils, 7, 8, and 9, are arranged in superposed position, for maintaining zones of different temperature in the vessel. Associated with these zones are three gas-escape tubes 10, 12, and 11 respectively. In the upper third of the desorber we maintain, for instance, a temperature of 20° C., in the center zone a temperature from 60–80° C., and in the lower third, a temperature of 130° C. $CO_2$ will escape through the uppermost tube 10, $H_2O$ through the lowermost tube 11; HCN of the desired purity can be withdrawn through tube 12.

For the introduction of a carrier gas a tube 13 is provided, while for the escape of gas a tube 14 is arranged, said gas streaming through the desorber in the same direction with the active carbon. In case the countercurrent principle is to be used, the carrier gas may be admitted at 14 and withdrawn through 13. At the bottom of the desorption vessel 6, sluice 15 is provided through which the agent after desorption is withdrawn and conveyed to a cyclone 17 by way of the pipeline 16. After having passed the cyclone 17, the agent reaches once more the vessel 1, there to serve as adsorbent. For the return of the agent by way of line 16 and cyclone 17, a partial current of gas is used which is made to escape through a line 18 branching off from vessel 1.

It has been found that instead of active carbon other adsorption agents may be used for carrying out the method according to the invention, e.g. silica gel or alumina gel.

What we claim is:

A process for the recovery of hydrocyanic acid from gas mixtures of the same with substantial amounts of $CO_2$ and $H_2O$ by means of active carbon, which comprises impregnating said active carbon with phosphoric acid, adsorbing said gas mixtures thereon at temperatures below 10° C. and at atmospheric pressure, desorbing said gas mixtures and separating them into $CO_2$, HCN and steam stepwise by raising the temperature, by which means $CO_2$ is obtained at temperatures of 10–30° C. and HCN at temperatures of 60–80° C. and water above 130° C.

References Cited in the file of this patent

UNITED STATES PATENTS

| 2,519,874 | Berg | Aug. 22, 1950 |
| 2,634,817 | McKinnis | Apr. 14, 1953 |
| 2,762,452 | Gains | Sept. 11, 1956 |